United States Patent [19]
Dekel

[11] Patent Number: 5,346,159
[45] Date of Patent: Sep. 13, 1994

[54] PAY OUT SYSTEM AND TENSION LIMITER DEVICE INCLUDED THEREIN

[75] Inventor: Ehud Dekel, Nofit, Israel

[73] Assignee: State of Israel, Ministry of Defence-Rafael-Armament Development Authority, Haifa, Israel

[21] Appl. No.: 66,258

[22] Filed: May 25, 1993

[30] Foreign Application Priority Data

May 29, 1992 [IL] Israel .................................... 102053

[51] Int. Cl.⁵ ........................ B65H 75/02; F41G 7/00
[52] U.S. Cl. ................ 244/3.12; 242/422.4; 242/388.1; 242/611
[58] Field of Search ........... 242/54 R, 86.5 R, 86.5 A, 242/100.1, 107.1, 107.11, 107.12, 107.13; 244/3.12; 280/292, 480, 480.1; 273/360, 361

[56] References Cited

U.S. PATENT DOCUMENTS

| | | | |
|---|---|---|---|
| 1,296,434 | 3/1919 | Schanil | 280/480 X |
| 2,051,735 | 8/1936 | Michelson | 242/107.11 |
| 4,416,429 | 11/1983 | Jessamine | 242/100.1 X |
| 5,044,573 | 9/1991 | LeCompte | 242/54 R |
| 5,102,063 | 4/1992 | Brum | 273/360 X |

FOREIGN PATENT DOCUMENTS

| | | | |
|---|---|---|---|
| 1939006 | 2/1970 | Fed. Rep. of Germany | 280/480 |
| 1288137 | 2/1962 | France | 242/107.1 |
| 547037 | 8/1942 | United Kingdom | 280/480 |

*Primary Examiner*—John M. Jillions
*Attorney, Agent, or Firm*—Mark M. Friedman

[57] ABSTRACT

A pay out system for paying out a flexible elongated element such as a filament, connecting a first object such as an air vehicle, to a second object such as a launcher, includes a bobbin carried by the first object and having a first flexible elongated element wound therearound one end of which is connected to the first object and the opposite end of which is connected to the second object by a second flexible elongated element wound in loop form on a second bobbin adjacent to the second object. A tension sensor senses the tension in the second flexible elongated element. A clutch normally couples the second bobbin to the tension sensor but is effective, when the tension in the second flexible elongated element reaches a predetermined value, to decouple the second bobbin and to permit it to rotate in a direction to pay out the second flexible elongated element from the second bobbin.

14 Claims, 1 Drawing Sheet

PAY OUT SYSTEM AND TENSION LIMITER DEVICE INCLUDED THEREIN

FIELD AND BACKGROUND OF THE INVENTION

The present invention relates to a pay out system for paying out a flexible elongated element between two relatively movable objects, and also to a tension limiter device included in such a system.

The term "flexible elongated element" is used herein in a very broad sense, and is intended to include not only filaments, such as metal wires or optical fibers, but other types of devices, such as fluid-conducting tubes, radio-frequency waveguides, and the like, which may be payed out from one object moving relative to another object. The invention is particularly useful in a filament (e.g., metal wire or optical fiber) pay out system for an air vehicle launched from a launcher, and is therefore described below with respect to this application, but it will be appreciated that the invention could advantageously be used with respect to systems including other types of flexible elongated elements such as mentioned above.

Some types of air vehicles launched from a launcher are guided by a filament which is payed out as the air vehicle moves away from the launcher. The filament serves to feed the control commands to the air vehicle, and also to relay data sensed by the air vehicle back to the site of the launcher. The older systems used metal wire filaments for this purpose, but more recent systems use optical fiber filaments. In both cases the filaments are of very small diameter and therefore very light in weight, but nevertheless the filaments may be subjected to a substantial tension caused by wind drag as the filament is payed out because of the long length of the filament and the long time it is in the air. If the tension becomes excessive, the filament may break which would cause a catastrophic interruption in the communication with the air vehicle.

OBJECTS AND BRIEF SUMMARY OF THE INVENTION

An object of the present invention is to provide a system for paying out a flexible elongated element, which system automatically, and relatively precisely, limits the tension to which the flexible elongated element may be subjected. Another object of the invention is to provide a filament pay out system having an automatic tension-limiting arrangement for use in launching an air vehicle from a launcher. A further object of the invention is to provide a tension limiter device particularly useful in such systems.

According to the present invention, there is provided a pay out system for paying out a flexible elongated element connecting a first object to a second object, and including a first bobbin carried by the first object and having a first flexible elongated element wound therearound one end of which is connected to the first object and the opposite end of which is connected to the second object. The opposite end of the first flexible elongated element is connected to a second object by a second flexible elongated element wound in loop form on a second bobbin adjacent to the second object, with one end of the second flexible elongated element joined to the opposite end of the first flexible elongated element, and the opposite end of the second flexible elongated element connected to the second object. The pay out system further includes a tension sensor for sensing the tension in the second flexible elongated element; and a clutch normally coupling the second bobbin to the tension sensor but effective, upon the tension sensor sensing a tension in the second flexible elongated element reaching a predetermined value, to decouple the second bobbin from the tension sensor and to permit the second bobbin to rotate in a direction to pay out the second flexible elongated element from the second bobbin, and thereby to prevent the tension in the first and second flexible elongated elements from exceeding the predetermined value.

According to further features in the preferred embodiment of the invention described below, the flexible elongated element is a filament, the first object is an air vehicle, and the second object is a launcher from which the air vehicle is launched. More particularly, the first and second wires are optical fiber filaments.

According to a further aspect of the invention, there is provided a tension limiter device connected to a flexible elongated element under tension between two relatively-movable objects in order to prevent the tension from exceeding a predetermined value, comprising: a bobbin on which the central portion of the flexible elongated element is wound in loop form, with one end of the flexible elongated element connected to one object and the opposite end of the flexible elongated element connected to the other object; a tension sensor for sensing the tension in at least one of the ends of the flexible elongated element; and a clutch normally coupling the bobbin to the tension sensor but effective, upon the tension sensor sensing a tension reaching a predetermined value, to decouple the bobbin from the tension sensor and to permit the bobbin to rotate in a direction to pay out the flexible elongated element from the bobbin, and thereby to prevent the tension in the flexible elongated element from exceeding the predetermined value.

As will be more apparent from the description below, such a tension limiter device automatically, and relatively precisely, limits the tension to which the flexible elongated element is subjected as it is payed out from one object moving relative to another object. Conventional tension limiting devices based on friction have a high sensitivity to the friction coefficient. However, the friction coefficient may change because of surface roughness, wear, temperature, and other changing conditions. A tension limiter constructed in accordance with the foregoing features of the present invention has a much lower sensitivity to the friction coefficient, and therefore does not change as much with changing conditions.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF A PREFERRED EMBODIMENT

Figure 1:
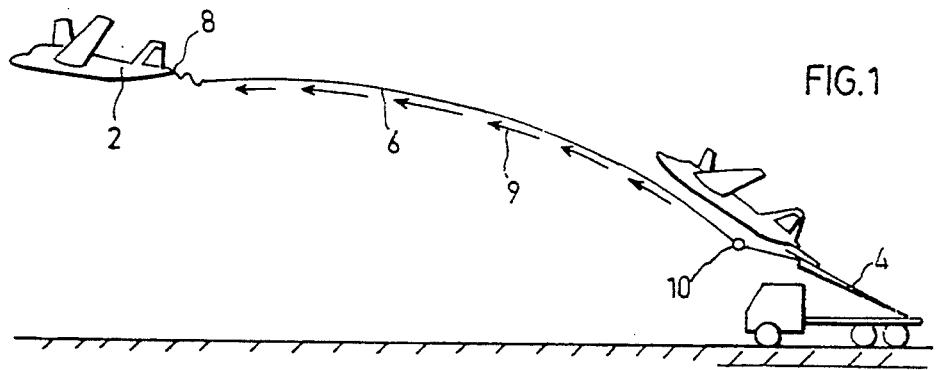
FIG. 1 pictorially illustrates one form of two-bobbin pay out system constructed in accordance with the present invention for paying out a flexible elongated element, in the form of an optical fiber, carried by an air vehicle launched from a launcher.

FIG. 1 pictorially illustrates a launching system for launching an air vehicle 2, such as a remotely-piloted aircraft, missile, or the like, from a launcher 4. The air vehicle 2 is continuously connected to the launcher 4 by a filament 6, such as an optical fiber. Before the air vehicle 2 is launched, the filament 6 is wound on a bobbin, schematically indicated at 8 in FIG. 1, carried by the air vehicle 2, and is payed out as the air vehicle moves away from the launcher 4. Primarily because of air drag (as illustrated by arrows 9 in FIG. 1) caused by wind or launcher motion, a tension may build up in the filament 6 as it is payed out while the air vehicle 2 moves away from the launcher 4. The system illustrated in FIG. 1 includes a tension limiter device, generally designated 10, on a second bobbin adjacent the launcher 4 effective to limit the tension in the filament 6 so as not to exceed a predetermined value which may endanger breakage of the filament.

Figure 2:
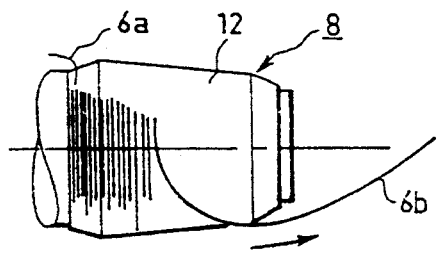
FIG. 2 illustrates the optical fiber bobbin on the air vehicle in the system of FIG. 1.

The filament pay out device 8 may be of conventional construction and is more particularly illustrated in FIG. 2. The tension limiter device 10, of a novel construction, is more particularly illustrated in FIGS. 3 and 4.

The filament pay out device 8 mounted on the air vehicle includes a conical bobbin 12 having the filament 6 wound thereon and lightly adhered thereto by an adhesive, as well known. One end 6a of the filament is connected to the equipment in the air vehicle, and the opposite end 6b is connected to the launcher 4 via the tension limiter device 10.

Figure 3:
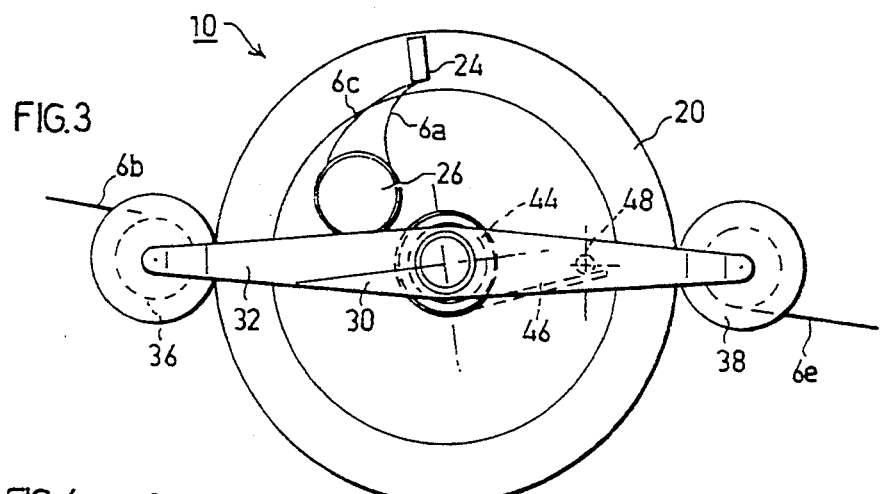
FIG. 3 is a side elevational view of the tension-limiting device in the optical fiber bobbin at the launcher end of the payed out optical fiber in the system of FIG. 1.
Figure 4:
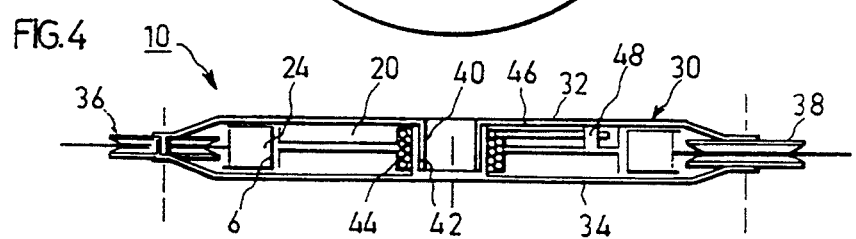
FIG. 4 is a top view of the tension limiter device of FIG. 3.

The tension limiter device 10, as shown more particularly in FIGS. 3 and 4, comprises a second bobbin 20 having an outer cylindrical surface 24 on which the filament 6 is wound. The portion of filament 6 wound on bobbin 20 is formed in a loop in which the connecting or juncture portion of the two loop sections, shown at 6c and 6a in FIG. 3, is received around a cylinder 26 to prevent a sharp bend from being formed in the filament, particularly if it is an optical fiber, which might cause breakage since such filaments break easily if bent too sharply.

Thus, as shown in FIG. 3, the central portion of filament 6 is wound in the form of a loop around cylindrical surface 24 of the bobbin 20, with one end of this portion of the filament being connected to filament end 6b leading to the aircraft, and the other end 6e being connected to the launcher 4 (FIG. 1). This loop portion of filament 6 is wound on bobbin 20 such that rotation of bobbin 20 clockwise will pay out filament from the looped sections 6c, 6a wound on the bobbin.

Figures 5, 5A:
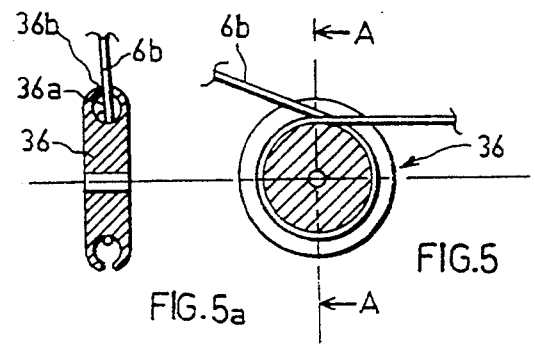
FIG. 5 is a side elevational view, partly in section, illustrating a modification in the construction of the rollers in the tension limiter device of FIGS. 3 and 4.
FIG. 5a is a sectional view along line A—A of FIG. 5.

The tension limiter device 10 illustrated in FIGS. 3 and 4 further includes a tension sensor for sensing when the tension on the filament 6 reaches a predetermined level. The tension sensor includes a bridge, generally designated 30, constituted of a pair of arms 32, 34 extending diametrically across the opposite sides of bobbin 20 and carrying, at their outer ends, a pair of rollers 36 and 38. Roller 36 receives end 6b of the filament leading to the air vehicle 2, and roller 38 receives end 6e of the filament leading to the launcher 4. The two rollers 36 and 38 may be formed with an annular groove 36a of circular cross section, and/or may be wrapped with a complete turn of the filament, as shown in FIGS. 5 and 5a. The opening 36b for the annular groove 36a is preferably less than the thickness of two filaments so as to prevent the filaments from unseating from the roller.

Bridge member 30 is formed with an inner hub 40 which is rotatably received within an inner hub 42 formed in the bobbin 20, such that the bridge member is pivotally (and rotatably) mounted with respect to bobbin 20. A coiled spring 44 is interposed between hub 42 of the bobbin 20, and hub 40 of the bridge member 30, and serves as a clutch for coupling the bridge to the bobbin. One end of spring 44 encloses hub 40 of bridge member 30, and the opposite end is formed with a tangential extension 46 engageable by a pin 48 carried by bobbin 20.

As will be described more particularly below, spring 44 is normally in its contracted condition so as to firmly engage hub 40 of bridge 30, and its end 46 is engageable with pin 48 of bobbin 20. The tension on the filament 6 is applied to bobbin 20 tending to rotate it clockwise (FIG. 3) with respect to the bridge member 30, causing pin 48 to apply a force to spring extension 46 tending to open the spring, i.e., to increase its diameter. When the tension on filament 6 is within the safe value, this force is not sufficient to open spring 44 to decouple it from hub 40 of bridge member 30. However, when the tension rises to the predetermined value which may endanger breakage of the filament, this force is sufficient to open spring 44 to decouple it from hub 40. As soon as spring 44 is thus decoupled from bridge member 30, the bobbin 20 is free to rotate (clockwise, FIG. 3) to pay out additional filament until the tension on the filament drops below the predetermined dangerous value, whereupon spring 44 again firmly engages hub 40 of bridge member 30 to recouple the bobbin to the bridge member.

The system illustrated in the drawings operates as follows:

Before launching the air vehicle 2 from the launcher 4, the filament 6 is wound on bobbin 12 of the filament pay out device 8 attached to the air vehicle 2, with one end 6a leading to the equipment on the air vehicle, and the opposite end 6b leading towards the launcher 4 via the tension limiter device 10. Bobbin 20 in the tension limiter device 10 adjacent the launcher receives a substantial length of the filament 6 in loop form, with the two sections 6c, 6d of the loop being wound around a cylinder 26 carried by bobbin 20 so as to prevent a sharp bend in the filament which might cause breakage. The two ends of the looped portion of the filament 6 carried by bobbin 20 pass over the two rollers 36, 38 carried at the opposite ends of the bridge 30. In addition, pin 48 carried by bobbin 20 engages extension 46 of spring 44 such that clockwise (FIG. 3) rotation of the bobbin 20 tends to open the spring.

The two rollers 36, 38 of bridge 30 thus sense the tension on the filament 6. This tension is translated by bobbin 20 and its pin 48 to a force acting on extension 46 of spring 44 in the direction tending to open the spring, i.e., to increase its diameter.

When the tension on filament 6 is within the safe (low) value, the force applied by pin 48 on spring extension 46 tending to open the spring is insufficient to decouple the spring from hub 40 of the bridge 30. Accordingly, bobbin 20 will remain coupled to bridge 30, and therefore the bridge will not permit the bobbin to rotate.

However, should the tension in filament 6 rise to the predetermined unsafe value, endangering breakage of the filament, the force applied by pin 48 against extension 46 of spring 44 opens spring 44 sufficiently to decouple it from hub 40 of bridge 30. This permits bobbin 20 to rotate (clockwise, FIG. 3) with respect to the bridge, and thereby to pay out some of the filament 67, which causes a reduction in the air flow rate along the filament. This results in lowering the air drag acting on the filament and lowers the tension until the tension drops to the safe value, whereupon spring 44 recouples bobbin 20 to the bridge 30.

Both the pay out bobbin 12 and the tension-limiter bobbin 20 may be wound with a single continuous filament in the following manner: Wind the pay out bobbin 12 with its normal length of filament and apply a light adhesive to those windings; wind an additional length of filament on bobbin 12 equal to one-half the length to be received on the tension-limiter bobbin 20, this additional length of filament not to include any adhesive; apply roller 26 of the tension-limiting bobbin 20 to the mid-part of the additional length of filament; and then rotate the tension-limiting bobbin 20 to pay out the one-half additional length of filament from bobbin 12, and the other one-half from the supply bobbin.

The loop-form tension control bobbin 20 has an advantage over other types of bobbins in that, once it detaches from the launcher, the filament connecting it to the launcher is stationary relative to the launcher, and while being released from the bobbin, it does not wear on the launcher surfaces and edges. This arrangement has the following two further advantages: as compared to a pivoted bobbin in the launcher, the described arrangement obviates the need for a rotary electrical-optical connnector; in addition, as compared to an axial payout bobbin (similar to the airborne bobbin 8 of FIG. 2), the tension in the novel tension control bobbin 20 is not created by an adhesive which might cause sharp bending, signal loss, breakage, and/or uneven tension control.

As indicated earlier, an important advantage of the described spring friction mechanism over other friction mechanisms is its low sensitivity to the friction coefficient, which may change because of surface roughness, corrosion, wear, humidity, oil deposits, temperature, etc. The spring friction torque (neglecting end effects) is defined by the formula:

$$T = 0.049 \, Ed^4 \, \frac{R - Rn}{Rn \cdot R} \, (1 - e^{-\mu\theta})$$

where
E = spring material young modulus
d = spring filament diameter
Rn = spring coil free mean radius
R = spring coil mean radius, when coiled on shaft
$\mu$ = coefficient of friction, spring shaft
$\theta$ = spring angle of tie (= No. of wraps x $2\pi$)
It can be easily seen that for $\mu\theta$ having a value $\mu\theta > 3$ (for example: $\mu = 0.1$, 5 wraps), the torque is almost insensitive to $\mu$. This arrangement enables a precise tension limit to be fixed.

It will be appreciated that the same effect can be produced by providing an arrangement wherein the diameter of the spring 44 would be reduced, rather than increased, to decouple the hub of bobbin 20 and thereby permit the bobbin 20 to rotate with respect to the bridge to pay out filament, when the tension in the filament rises to a predetermined unsafe value. In such an alternate arrangement, pin 48 would be on the bridge 32 beneath extension 46 and would bend extension 46 counter-clockwise to close the spring, and thereby to reduce the force applied by its outer surface to the hub of bobbin 20 when the tension in the filament rises to the predetermined unsafe value.

The invention may also be used for remotely piloting ground and underwater vehicles. The launcher can be a ground vehicle, helicopter, boat or submarine. The invention could also be used to control the tension of other flexible elongated elements, such as fluid conducting tubes, and radio-frequency conducting waveguides, payed out from one object moving with respect to a second object. For a slow moving system, the tension-limiting bobbin 20 may be sufficient, without the bobbin 8.

While the invention has been described with respect to one preferred embodiment, it will be appreciated that this is set forth purely for purposes of example, and that many other variations, modifications and applications of the invention may be made.

What is claimed is:

1. A pay out system for paying out a flexible elongated element connecting a first object to a second object, and including a first bobbin carried by the first object and having a first flexible elongated element wound therearound one end of which is connected to the first object and the opposite end of which is connected to the second object;

characterized in that said opposite end of the first flexible elongated element is connected to the second object by a second flexible elongated element wound in loop form on a second bobbin adjacent to the second object, with one end of the second flexible elongated element joined to said opposite end of the first flexible elongated element, and the opposite end of the second flexible elongated element connected to the second object;

said pay out system further including a tension sensor for sensing the tension in said second flexible elongated element;

and a clutch normally coupling said second bobbin to said tension sensor but effective, upon the tension sensor sensing a tension in the second flexible elongated element reaching a predetermined value, to decouple the second bobbin from the tension sensor and to permit the second bobbin to rotate in a direction to pay out said second flexible elongated element from said second bobbin, and thereby to prevent the tension in said first and second flexible elongated elements from exceeding said predetermined value.

2. The system according to claim 1, wherein said first object is an air vehicle, and said second object is a launcher from which said second object is launched.

3. The system according to claim 1, wherein said first and second flexible elongated elements are optical fiber filaments.

4. The system according to claim 1, wherein said tension sensor comprises a roller engageable with one end of said second flexible elongated element and pivotally mounted to said second bobbin.

5. The system according to claim 4, wherein said tension sensor further comprises a second roller engageable with the opposite end of said second flexible elongated element, both said rollers being mounted on the opposite ends of a bridge member pivotally mounted to said second bobbin.

6. The system according to claim 5, wherein said clutch is a coiled spring clutch normally coupling said bridge member to said second bobbin but effective, upon the tension in said second flexible elongated element reaching said predetermined value, to decouple the second bobbin from the bridge and thereby to permit the second bobbin to rotate in the direction to pay out its second flexible elongated element until the tension in said second flexible elongated element drops below said predetermined value.

7. The system according to claim 6, wherein said coiled spring is normally disposed between a hub on the second bobbin and a hub on the bridge member, said coiled spring being normally contracted to grip the hub of the bridge member, but being engageable by a pin carried by the second bobbin such that the pin tends to expand the spring by a force corresponding to the tension in the second flexible elongated element, whereby when the tension in the second flexible elongated element reaches said predetermined value, the force applied by the pin to the spring is sufficient to disengage the spring from said bridge member hub, and thereby to permit the second bobbin to rotate with respect to said bridge member in the direction to pay out the second flexible elongated element.

8. A filament pay out system for an air vehicle launched from a launcher, comprising:
a first bobbin carried by the air vehicle and having a first filament wound thereon with one end connected to the air vehicle and the opposite end connected to the launcher;
a second bobbin carrying a second filament adjacent the launcher end of the first filament, said second filament being wound in loop form on said second bobbin, with one end of the second filament fixed to said opposite end of the first filament, and the opposite end of the second filament connected to the launcher;
a tension sensor for sensing the tension in said second filament;
and a clutch normally coupling said second bobbin to said tension sensor but effective, upon the tension sensor sensing a tension in the second filament reaching a predetermined value, to decouple the second bobbin from the tension sensor and to permit the second bobbin to rotate in a direction to pay out said second filament from said second bobbin, and thereby to prevent the tension in said first and second filaments from exceeding said predetermined value.

9. The system according to claim 8, wherein said first and second filaments are constituted of a common fiber optic filament.

10. A tension limiter device connected to a flexible elongated element under tension between two relatively-movable objects in order to prevent the tension from exceeding a predetermined value, comprising:
a bobbin on which the central portion of the flexible elongated element is wound in loop form, with one end of the flexible elongated element connected to one object and the opposite end of the flexible elongated element connected to the other object;
a tension sensor for sensing the tension in at least one of the ends of the flexible elongated element;
and a clutch normally coupling said bobbin to said tension sensor but effective, upon the tension sensor sensing a tension reaching a predetermined value, to decouple the bobbin from the tension sensor and to permit the bobbin to rotate in a direction to pay out said flexible elongated element from said bobbin and thereby to prevent the tension in said flexible elongated element from exceeding said predetermined value.

11. The device according to claim 10, wherein said tension sensor comprises a roller engageable with one end of said flexible elongated element and pivotally mounted to said bobbin.

12. The device according to claim 11, wherein said tension sensor further comprises a second roller engageable with the opposite end of said flexible elongated element, both said rollers being mounted on the opposite ends of a bridge member pivotally mounted to said bobbin.

13. The device according to claim 12, wherein said clutch is a coiled spring clutch normally coupling said bridge member to said bobbin but effective, upon the tension in said flexible elongated element reaching said predetermined value, to decouple the bobbin from the bridge member and thereby to permit the bobbin to rotate in the direction to pay out its flexible elongated element from said bobbin.

14. The device according to claim 13, wherein said coiled spring is normally disposed between a hub on the bobbin and a hub on the bridge member, said coiled spring being normally contracted to grip the hub of the bridge member, but being engageable by a pin carried by the bobbin such that the pin tends to expand the spring by a force corresponding to the tension in the flexible elongated element, whereby when the tension in the flexible elongated element reaches said predetermined value, the force applied by the pin to the spring is sufficient to disengage the spring from said bridge member hub, and thereby to permit the bobbin to rotate with respect to said bridge member in the direction to pay out the flexible elongated element.

* * * * *